United States Patent

[11] 3,609,290

| | | |
|---|---|---|
| [72] | Inventor | Gerald A. Lawrence<br>Detroit, Mich. |
| [21] | Appl. No. | 783,633 |
| [22] | Filed | Dec. 13, 1968 |
| [45] | Patented | Sept. 28, 1971 |
| [73] | Assignee | La-Mark Corporation<br>Detroit, Mich. |

[54] ELECTRIC ARC CONTROL SYSTEM
8 Claims, 2 Drawing Figs.

[52] U.S. Cl. ..................................... 219/131 R,
219/131 WR
[51] Int. Cl. ............................................. B23k 9/10
[50] Field of Search ........................................... 219/131,
135; 307/301

[56] References Cited
UNITED STATES PATENTS

| 2,574,514 | 11/1951 | Volff et al. .................... | 219/131 X |
| 2,867,730 | 1/1959 | Welch ........................... | 219/131 X |
| 2,891,196 | 6/1959 | Lisser ............................ | 219/131 X |
| 2,898,516 | 8/1959 | Volff ............................. | 219/131 X |
| 3,328,637 | 6/1967 | Aldenhoff ..................... | 219/131 X |

*Primary Examiner*—J. V. Truhe
*Assistant Examiner*—C. L. Albritton
*Attorney*—Irving M. Weiner

ABSTRACT: An all solid-state electric arc starting and control system which may be used for electric welding or cutting operations. The control system includes a three-stage amplification of the output of a unijunction transistor relaxation oscillator. This produces a high frequency control current which regulates the main heavy duty welding current, and will serve to automatically restart the electric arc should the main welding current fail.

INVENTOR.
GERALD A. LAWRENCE

BY Irving M. Weiner
ATTORNEY 3,609,290

ELECTRIC ARC CONTROL SYSTEM

CROSS-REFERENCE TO RELATED APPLICATION

The present invention may be used as the electronic control circuit for the invention disclosed in the copending application Ser. No. 714,850, filed Mar. 21, 1968 entitled "Jig Welding Gun" of the same applicant and which is owned by the assignee of the present application.

BACKGROUND OF THE INVENTION

1. Field of the Invention

The present invention relates to the field of art concerned with electronic control systems for regulating electric arcs, such as encountered in welding or arc cutting devices.

2. Description of the Prior Art

The closest prior art to the electric arc control system of the present invention resides in the field of arc welding systems. Such prior systems include means for ionizing gas between electrodes, one of which is the main electrode of an arc torch. In such prior systems, a high-frequency arc is used to ionize the gas between the electrode and the nozzle in order to start a pilot arc between the electrode and the nozzle. The pilot arc in turn ionizes the gas flowing to the workpiece and initiates the main arc between the electrode and the workpiece. In contrast, the present invention does not employ an insulated gas cup for the arc torch nor for striking a pilot arc. In the present invention, the arc is struck directly between the welding torch and the workpiece.

Moreover, the present invention provides an all solid-state arc starting system. The invention also provides an automatic shutoff on high-frequency arc starts which result in the elimination of interferences to radar, radio, television, etc. Furthermore, the solid-state system provides for a compact control unit. By use of individual units, the user has the option of placing them around the torch tool fixture area. In addition, each power source can be adjusted to control the power of each welding torch gun.

SUMMARY OF THE INVENTION

The present invention provides an electric arc control system including a circuit for producing an electric arc having a first predetermined frequency. There is also provided means for generating pulses or oscillations of a second predetermined frequency which is greater than the first predetermined frequency. The pulse or oscillation generating means includes a relaxation oscillator. Impedence means connect the generating means to the electric arc producing circuit to superimpose the greater second predetermined frequency on the first predetermined frequency for controlling the operation of the electric arc.

BRIEF DESCRIPTION OF THE DRAWING

For a more complete understanding of the nature in scope of this invention, reference may be had to the following detailed description taken together with accompanying drawings, in which.

DETAILED DESCRIPTION OF THE PREFERRED EMBODIMENTS

Figure 1:
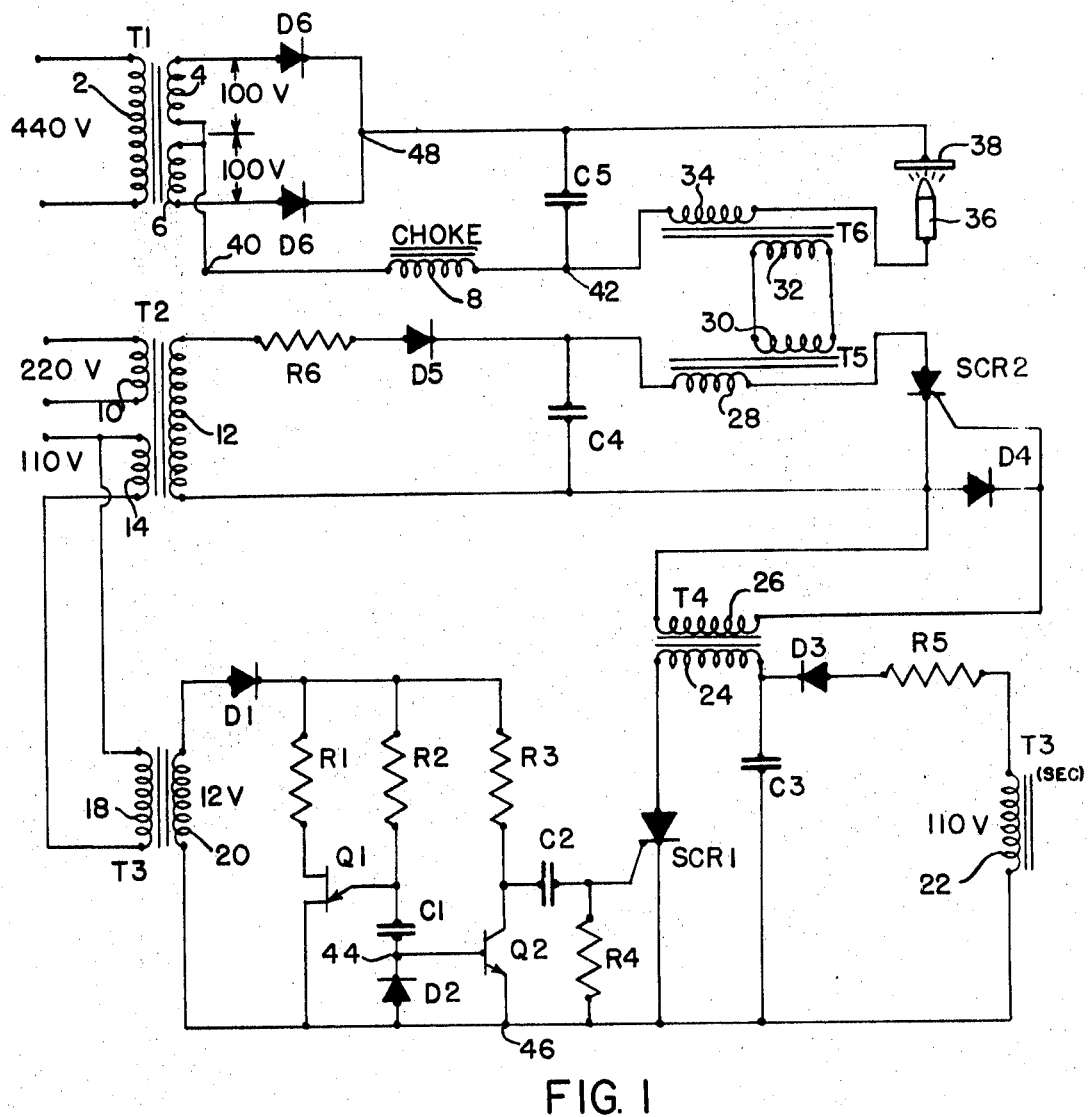
FIG. 1 illustrates diagrammatically the circuit components and connections which may be employed in practicing a first embodiment of the present invention.

The arc control system of the present invention may be described as a three-stage amplification of a unijunction relaxation oscillator, which includes a unijunction transistor Q1. The power supply for the unijunction oscillator is of the half-wave nonfiltered type. Therefore, the oscillation or pulse will take place every other half cycle when the voltage is sufficiently high.

The unijunction transistor Q1 may be fed by a 12-volt secondary winding 20 of a transformer T3 which is half-wave rectified by a diode D1. A relaxation oscillation takes place in a capacitor C1 every other half cycle when the voltage across the capacitor C1 attains a sufficiently high value. A high amplitude sawtooth voltage wave is generated across the capacitor C1.

A transistor Q2 performs the first amplification. It should be noted that base-emitter space of the transistor Q2 is in series with the capacitor C1 of the unijunction relaxation oscillator. When the capacitor C1 is positively charged, the charge in turn passes through the base-emitter space of the transistor Q2. When the capacitor C1 discharges, the discharge current passes through the diode D2 which bridges the base-emitter space of the transistor Q2 in an inverse parallel fashion. With this circuit arrangement, the collector voltage of the transistor Q2 is rectangular as a function of time. The positive fronts of the collector voltage are differentiated by the resistor R4 capacitor C2 network which supplies the firing current for a silicon-controlled rectifier SCR1.

The silicon controlled rectifier SCR1 is part of a capacitor discharge circuit which is energized by the 110-volt secondary winding 22 of the transformer T3. The capacitor C3 charges through the resistor R5 and the diode D3, which are connected in series to the secondary winding 22 of the transformer T3. When a firing pulse occurs on the trigger or gate electrode of the silicon controlled rectifier SCR1, the rectifier SCR1 is turned on and the capacitor C3 will discharge through the primary winding 24 of transformer T4 and the now-conducting rectifier SCR1. The pulse impressed across the primary winding 24 of transformer T4 will turn on the silicon controlled rectifier SCR2. The rectifier SCR1 will turn off because of lack of current when the capacitor C3 is completely discharged. This occurs during the half-cycle when the anode of the diode D3 is negative due to phasing considerations.

The silicon controlled rectifier SCR2 is part of a capacitor discharge circuit similar to the one on which the silicon controlled rectifier SCR1 is a part, except that here the power and voltage levels are substantially higher. It should be noted that here the power for the rectifier SCR2 is supplied by a 330-volt AC secondary winding 12 of the transformer T2. The capacitor C4 is charged by the series-connected secondary winding 12, the resistor R6, and the diode D5. A high-voltage pulse is generated once each cycle by the firing of the silicon controlled rectifier SCR2 to discharge the capacitor C4. It is important to note that this firing of the rectifier SCR2, with the attendant discharge of the capacitor C4, takes place each cycle whether or not a weld current is flowing between the welding torch 36 and workpiece 38. This is a very vital feature of the present invention because of the following.

If a weld current is flowing, the firing action of the rectifier SCR2 is of little consequence. However, if the weld current is not flowing, the high-voltage pulse generated each cycle by the firing of the rectifier SCR2 will restart the arc between the welding torch 36 and the workpiece 38.

It is also important to note that this high-voltage pulse which appears across the primary winding 28 of transformer T5 is elevated in two steps by the transformers T5 and T6. For example, the transformer T5 may have a winding ratio of 1 to 3 and the transformer T6 may have a winding ratio of 1 to 20, thereby presenting a total winding ratio of 1 to 60.

Some typical components which may be used in the preferred embodiment illustrated in FIG. 1 are indicated in the following bill of materials.

| | |
|---|---|
| R1 | 1K. ½ watt resistor 10% |
| R2 | 10K. "1 |
| R3 | 390 2 watt 10% |
| R4 | 100 ½ watt 10% |
| R5 | 250 10 watt 10% |
| R6 | 50 25 watt 10% |
| C1 | 0.068 mfd. 0 50v. minimum |
| C2 | 0.22 mfd. 0 100v. |

Table — Continued

| | |
|---|---|
| C3 | 0.47 mfd. 0 200v. mylar or paper |
| C4 | 4 mfd. 0 600v. |
| C5 | 0.1 mfd. 0 600v. |
| Q1 | 2N2646 unijunction transistor |
| Q2 | 2N1711 transistor |
| SCR1 | 2N4154 Motorola |
| SCR2 | NL C45M National Electronics |
| D1 | 1N3255 |
| D2 | 1N3255 |
| D3 | 1N3255 |
| D4 | 1N3255 |
| D5 | 1N1347B |
| D6 | MR 1238 or 1N3169R 240 amp 0 500v. |
| T6 | 1T 12 ga. pri/20T sec. for arc duty on 10 Arnold AL 19 cores |
| T2 | 220/440–110/220 0 300 VA control transformer |
| T3 | 1 115 pri/115 0 50VA; 12v. 0 2 VA sec. (Midland TRA-1074 or equal) |
| T4 | 30T 20 ga. pri/10T 20 ga. sec. on Arnold AM 22 core |
| T5 | 2T 12 ga. pri/6T 12 ga. sec. on 3 Arnold AL 131 cores |

In practice, it has been found desirable to employ two series-connected diodes D5, of the 1N1347B type, between the resistor R6 and the capacitor C4.

With reference to FIG. 1, it may be seen that the main welding circuit comprises the transformer T1 having a secondary winding which is divided into a winding 4 and a winding 6. The windings 4 and 6 may have an equal number of turns, and they are each connected in series with a similar diode D6. The cathodes of the two diodes D6 are joined electrically at point 48. Junction 48 is electrically connected to the workpiece 38 which is to be welded or cut by an electric arc.

The junction of windings 4 and 6 is electrically connected to one terminal 40 of a reactor choke 8. The other terminal 42 of the reactor choke 8 is connected to the secondary winding 34 of transformer T6. A capacitor C5 connects terminal 48 with terminal 42. The secondary winding 34 is connected in series with the welding or cutting torch 36. The high-frequency control pulses or oscillations are brought into the main or primary welding circuit through the transformers T5 and T6.

Figure 2:
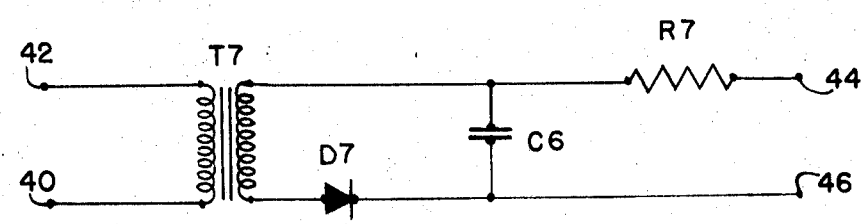
FIG. 2 illustrates diagrammatically a circuit which may be used as an adjunct or addition to the circuit of FIG. 1 to obtain a second embodiment of the present invention.

FIG. 2 shown an optional adjunct which may be additionally connected to the circuitry of FIG. 1 to attain a second embodiment of the present invention. The circuitry of FIG. 2 may be connected to the terminals 40 and 42 across the reactor choke 8 in the primary or main welding circuit. The other end of the FIG. 2 circuitry may be connected to the terminals 44 and 46 which are connected to the base and emitter, respectively, of the transistor Q2. In operation, the FIG. 2 adjunct circuitry works in the following manner.

Following the high-frequency arc firing in the main welding circuit, the heavy-duty welding current flowing through the reactor choke 8 is tapped off and fed through the transistor Q2, thus cutting off the high-frequency arc. If the heavy duty or main welding arc fails, then the high-frequency arc automatically restarts.

The circuitry of FIG. 2 functions to disable the high-frequency arc or control pulses when the main weld current flows. When the main weld current or arc stops, the transformer T7 is no longer energized. Under such conditions, the capacitor C6 will discharge through the resistor R7 and the diode D2. When the capacitor C6 discharges sufficiently, the transistor Q2 will again conduct and thereupon fire the silicon controlled rectifier SCR1 and produce a high-voltage pulse.

The circuitry of FIG. 2 can be considered an option because its use is to disable the high-frequency control pulses when the main weld current is flowing. The time required for restarting the high-frequency control pulses or oscillations can be controlled depending upon the values of components selected for the capacitor C6 and the resistor R7.

Typical components for the FIG. 2 circuitry may be as follows. The diode D7 may be a 1N3255. The capacitor C6 may be a 40-microfarad capacitor having a working voltage of 400 volts DC The resistor R7 may be a 100-k. ohm resistor having a power rating of 10 watts.

Since certain changes can be made in the foregoing circuitry and construction, and different embodiments of the invention can be made without materially departing from the spirit and scope of the invention, it is intended that all subject matter shown in the accompanying drawings and described hereinabove shall be interpreted as illustrative only, and not in a limiting sense.

What is claimed is:

1. An electric arc control system comprising, in combination: a circuit for producing an electric arc having a first predetermined frequency; means for generating electric signals of a second predetermined frequency which is greater than said first predetermined frequency; said generating means including a relaxation oscillator; impedance means connecting said generating means to said electric arc producing circuit to superimpose said greater second predetermined frequency on said first predetermined frequency for controlling the operation of said electric arc; said circuit for producing an electric arc having a first predetermined frequency including at least two inductance elements which are connected in series to an electric arc torch; and only one of said inductance elements being directly connected to said torch and being the electrical component through which said signals of said second predetermined frequency are introduced into said circuit for producing the electric arc having said first predetermined frequency.

2. An electric arc control system comprising, in combination: a circuit for producing an electric arc having a first predetermined frequency; means for generating electric signals of a second predetermined frequency which is greater than said first predetermined frequency; impedance means connecting said generating means to said electric arc producing circuit to superimpose said greater second predetermined frequency on said first predetermined frequency for controlling the operation of said electric arc; said means for generating said signals of a second predetermined frequency which is greater than said first predetermined frequency including a multiamplified unijunction transistor relaxation oscillator; and a power supply for said unijunction transistor relaxation oscillator which is of the half-wave nonfiltered type so that at least one of said signals occurs every other half cycle when the voltage is sufficiently high.

3. An electric arc control system comprising, in combination: a circuit for producing an electric arc having a first predetermined frequency; means for generating electric signals of a second predetermined frequency which is greater than said first predetermined frequency; impedance means connecting said generating means to said electric arc producing circuit to superimpose said greater second predetermined frequency on said first predetermined frequency for controlling the operation of said electric arc; said means for generating said signals of the second predetermined frequency including a unijunction transistor relaxation oscillator; an amplifier circuit for amplifying the output of said unijunction transistor relaxation oscillator; said circuit for producing an electric arc having a first predetermined frequency including a reactor choke element; and a circuit for connecting said reactor choke element to said amplifier signal circuit to terminate the generation of said signals of said predetermined frequency when a current is flowing through said reactor choke element.

4. An electric arc control system according to claim 3, characterized in that said impedance means connecting said generating means to said electric arc producing circuit includes a transformer, the primary winding of said transformer receiving the amplified output of said unijunction transistor relaxation oscillator, and the secondary winding of said transformer constituting a component within said circuit for producing an electric arc and being connected in series with an electric arc torch.

5. An electric arc control system according to claim 4, characterized in that said amplifier circuit for said unijunction transistor relaxation oscillator is a three-stage amplifier including one transistor and two silicon controlled rectifiers, and said system comprises an all solid-state electric arc starting and control system.

6. An electric arc control system according to claim 4, characterized in that each of said two silicon controlled rectifiers has its associated anode electrode connected to a capacitance element which in turn is connected to the cathode electrode of the respective silicon controlled rectifier.

7. An electric arc control system comprising, in combination: a circuit for producing an electric arc having a first predetermined frequency; means for generating electric signals of a second predetermined frequency which is greater than said first predetermined frequency; said generating means including a relaxation oscillator; impedance means connecting said generating means to said electric arc producing circuit to superimpose said greater second predetermined frequency on said first predetermined frequency for controlling the operation of said electric arc; said relaxation oscillator including a unijunction transistor; and circuit means for sensing the flow of electric current in said circuit for producing an electric arc having said first predetermined frequency and for controlling the output of said unijunction transistor relaxation oscillator whereby said signals of said second predetermined frequency are transmitted to said circuit for producing an electric arc only when no current is flowing in said circuit for producing an electric arc.

8. An electric arc control system according to claim 7, characterized in that said circuit means for sensing the flow of electric current in said circuit for producing an electric arc includes a reactor choke element which also forms a component of said circuit for producing an electric arc having said first predetermined frequency.